United States Patent [19]
Squires

[11] 3,957,457
[45] *May 18, 1976

[54] GASIFYING COAL OR COKE AND DISCHARGING ASH AGGLOMERATES

[76] Inventor: Arthur M. Squires, 245 W. 104 St., New York, N.Y. 10025

[ * ] Notice: The portion of the term of this patent subsequent to Oct. 8, 1991, has been disclaimed.

[22] Filed: Oct. 7, 1974

[21] Appl. No.: 512,841

Related U.S. Application Data

[63] Continuation-in-part of Ser. No. 410,070, Oct. 26, 1973, Pat. No. 3,855,070, which is a continuation of Ser. No. 167,686, July 30, 1971, abandoned, and a continuation-in-part of Ser. No. 257,432, May 26, 1972, Pat. No. 3,840,353.

[52] U.S. Cl. .................................. 48/73; 48/63; 48/76; 48/77; 48/78; 48/203; 48/206; 48/210; 252/373, 252/375
[51] Int. Cl.² .................... C10J 3/20; C10J 3/42; C10J 3/46; C10J 3/54
[58] Field of Search ................ 48/197 R, 202, 203, 48/204, 206, 210, 63, 64, 73, 76, 78, 77; 252/373, 375

[56] References Cited
UNITED STATES PATENTS

| | | | |
|---|---|---|---|
| 1,840,649 | 1/1932 | Winkler et al. | 48/203 |
| 2,111,579 | 3/1938 | Winkler et al. | 48/203 |
| 3,840,353 | 10/1974 | Squires | 48/203 |

Primary Examiner—Joseph Scovronek
Attorney, Agent, or Firm—Abraham A. Saffitz

[57] ABSTRACT

Granulated coals or cokes derived from coal, in sizes up to about ¾ inch and containing ash matter with an initial deformation temperature above about 2,300°F, are fed to a slow fluidized bed comprising relatively large particles of coke intermingled with roughly spherical ash agglomerates, maintained at about 2,050°F to 2,650°F, and supplied with a gasification medium, for example, steam mixed with oxygen or air. A fast fluidized bed of coke fines is superposed above the slow bed and is contiguous therewith. Gasification products are discharged together with relatively fine particles of coke, which are collected and returned to the fast bed. Ash agglomerates are withdrawn from the bottom of the slow bed via a standpipe leading to a mechanical grate. An oxidizing medium is introduced below the grate to consume coke particles that accompany the ash agglomerates entering the standpipe.

7 Claims, 1 Drawing Figure

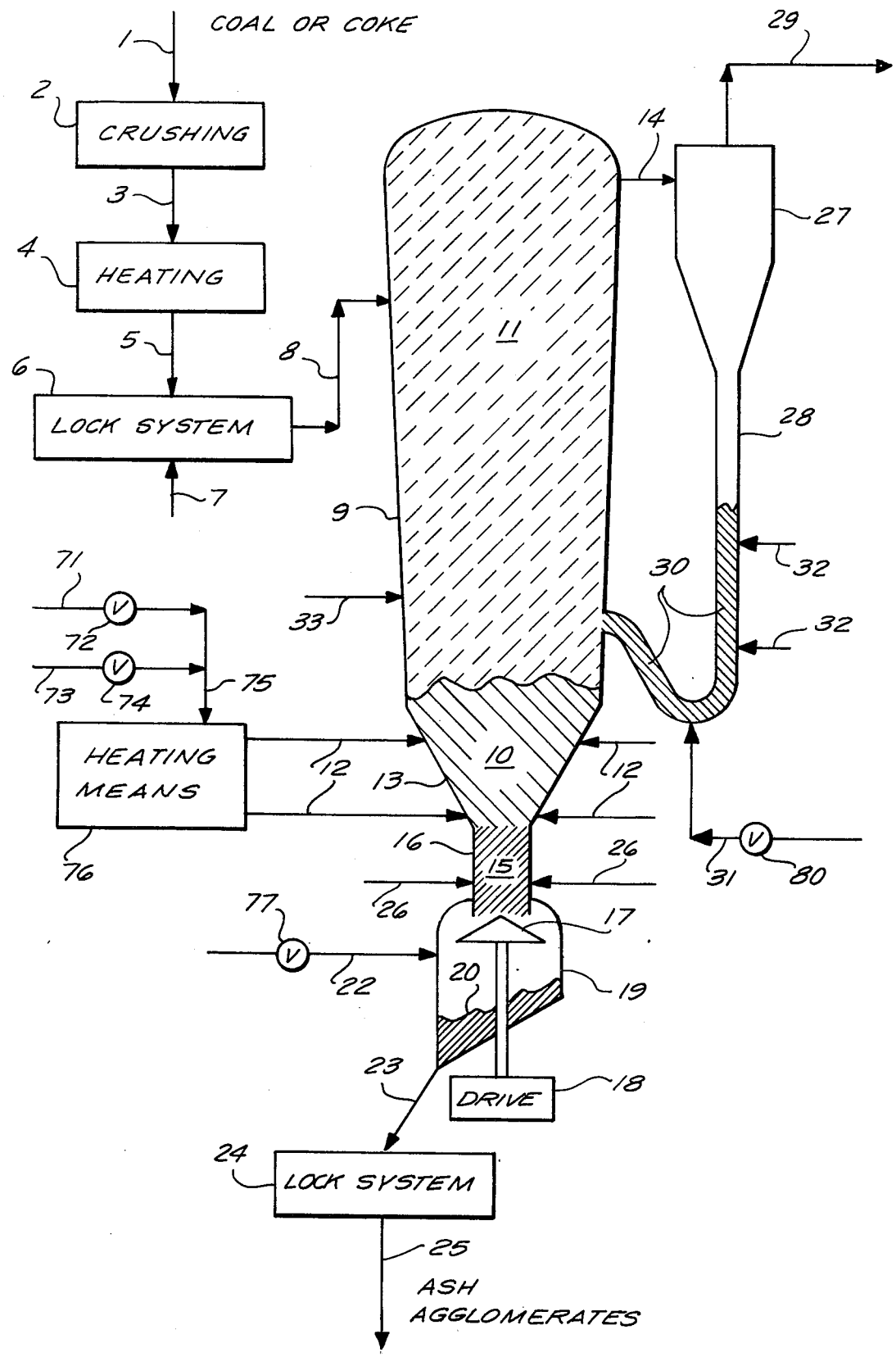

GASIFYING COAL OR COKE AND DISCHARGING ASH AGGLOMERATES

CROSS-REFERENCE TO RELATED APPLICATIONS

This application is a continuation-in-part of my co-pending application Ser. No. 410,070, filed Oct. 26, 1973, now U.S. Pat. No. 3,855,070, issued Dec. 17, 1974, which is a continuation of my application Ser. No. 167,686, filed July 30, 1971, now abandoned.

This application is also a continuation-in-part of my co-pending application Ser. No. 257,432, filed May 26, 1972, now U.S. Pat. No. 3,840,353, issued Oct. 8, 1974.

The instant application is also related to my two co-pending applications filed simultaneously herewith and entitled Gasifying Coal or Coke and Discharging Slag Frit, application Ser. No. 512,867, and Treating Carbonaceous Matter with Hot Steam, application Ser. No. 513,037.

FIELD OF THE INVENTION

The invention relates to an improved apparatus and method for gasifying granulated coal or coke derived from coal by reaction of the coal or coke with a gasification agent such as steam mixed with oxygen or air, or air acting alone, or gas mixtures containing carbon dioxide and oxygen.

DESCRIPTION OF THE PRIOR ART

U.S. Pat. Nos. 2,813,351 (Nov. 19, 1957), 2,866,696 (Dec. 30, 1958), 3,042,500 (July 3, 1962), 3,302,598 (Feb. 2, 1967), and 3,431,892 (March 11, 1969) generally disclose a procedure for gasifying granulated coal or coke derived from coal in a fluidized bed resting upon a travelling grate and operating at a temperature and at a gas velocity to promote formation of roughly spherical ash agglomerates in the bed that remain freely fluidized intermingled with particles of coke comprising the greater part of the fluidized bed until the ash agglomerates come to rest upon the travelling grate, which carries the agglomerates out of the bed and dumps them into an ash pit. In one disclosure (3,302,598) the agglomerates move toward ash disposal via a gravitating bed of the ash agglomerates with countercurrent flow of air to burn off carbon trapped within the agglomerates. The arrangements of these patents do not lend themselves readily to construction for operation at an elevated pressure, as is desirable if the gas made from the coal or coke is to be burned or further processed at pressure. The arrangements also do not lend themselves readily to a modification that would permit the retention of fine particles of coke in a concentrated bed of appreciable density for their further reaction and ultimate extinction by the gasification process.

BACKGROUND OF APPLICANT'S CO-PENDING APPLICATIONS

The aforementioned application Ser. No. 410,070 disclosed a process of gasifying coke beads produced by the hydropyrolysis of a bituminous or subbituminous coal or lignite. The process employs an ash-agglomerating fluidized bed.

The aforementioned application Ser. No. 257,432 disclosed a process for gasifying coal or coke derived from coal in a gasifier employing an ash-agglomerating slow fluidized bed of relatively large particles of coke with intermingled ash agglomerates together with a superposed contiguous fast fluidized bed of finer coke particles. This disclosure was primarily directed toward achieving a fuel gas in which the species hydrogen, carbon monoxide, and water vapor are present at concentrations which are substantially in thermodynamic equilibrium with carbon according to its reaction with steam. The temperature specified for the fluidized beds, between about 1,900°F and about 2,100°F, was selected in view of the two objectives, of achieving this equilibrium at approximately the lowest possible temperature for a given coal or coke feedstock, and of forming ash agglomerates from the ash matter of the feedstock containing little carbon.

GENERAL DESCRIPTION OF THE INVENTION

The instant application discloses apparatus and method for a wide range of coal- or coke-gasification process objectives, and more particularly useful for gasifying a coal or coke of relatively high ash-softening temperature with air to produce a fuel gas having a heating value of about 125 to 150 British thermal units (Btu) per cubic foot, that is to say, the so-called low-Btu gas or power gas or utility gas. The apparatus and method is also particularly useful for gasifying a coal or coke of relatively high ash-softening temperature with steam and air enriched in oxygen, enriched to an oxygen content of 50 volume per cent for example, to provide an industrial fuel gas having a heating value of about 240 to 270 Btu per cubic foot. I contemplate the production of these fuel gases on an extremely large scale to serve large industrial furnaces and boilers with a clean fuel gas. For such service, production of the gas with substantially complete utilization of carbon is an economically important objective.

I have found that a higher temperature than that specified in the aforementioned U.S. Pat. No. 3,840,353 is peculiarly desirable for gasification with air or mixtures of steam and air enriched in oxygen, where either little steam is present or such steam as is present is diluted by non-reacting nitrogen gas. This is apparently because much of the carbon must be gasified with carbon dioxide gas rather than with the more reactive steam. Especially in the case of relatively non-reactive coals such as anthracites and bituminous coals of higher rank, the objective of complete utilization of carbon makes use of the higher temperatures desirable, although I should point out that operation at the higher temperature of the instant invention generally involves giving up the earlier objective of attaining the aforementioned thermodynamic equilibrium. Of the two objectives, the complete utilization of carbon is the more important in the production of a gas for prompt combustion in an industrial furnace or boiler.

OBJECTS OF THE INVENTION

An object of the invention is to provide improved apparatus for gasifying coal or coke by its reaction with air, mixtures of air with steam or carbon dioxide or combustion products, and mixtures of oxygen or air enriched in oxygen with steam or carbon dioxide.

Another object is to provide apparatus and procedure for gasifying coal or coke that utilizes carbon with outstandingly high efficiency, converting substantially all of the carbon into gaseous species.

Another object is to provide apparatus and procedure for gasifying coals containing ash matter that displays a relatively high initial deformation temperature as determined by A.S.T.M. test, as well as cokes derived from such coals, with the capability of discharging the ash matter in form of agglomerates containing little carbon.

Another object is to provide apparatus and procedure for converting coal or coke into fuel gases including mixtures of hydrogen, carbon monoxide, and methane, as well as mixtures of these fuel species with nitrogen.

Another object is to provide apparatus and procedure for converting coal or coke into carbon monoxide and mixtures of this species with hydrogen suitable for a variety of chemical syntheses as well as for conversion into relatively pure hydrogen.

SUMMARY OF THE APPARATUS FEATURES OF THE INVENTION

The invention relates to an improved apparatus for gasifying granulated coal or coke derived from coal. There is provided a vessel housing contiguous upper and lower zones. Means are provided for feeding a granulated solid fuel, coal or coke derived from coal, to the vessel. Means are provided for introducing a gasification medium as fluidizing gas into the lower zone at a rate to establish therein a slow fluidized bed comprising particles of coke arising from the fuel intermingled with agglomerates of ash matter. The temperature of the slow fluidized bed is preferably between about 2,050°F and about 2,650°F. The fluidizing-gas velocity in the bed is greater than about 4 feet per second. A pipe conducts gas from an outlet at substantially the top of the upper zone to a means for substantially separating gas and solids, suitably a cyclone gas-solid separator. A pipe conducts separated gas from the separating means and discharges the gas. There are means for conducting the separated particles in a slow fluidized condition from the separating means to substantially the bottom of the upper zone. Means are provided for establishing a fast fluidized bed of the separated particles in the upper zone along with fine particles of coke that enter the upper zone from the slow fluidized bed of the lower zone; these means include means for regulating the rate of flow of the separated particles in the aforementioned slow fluidized condition. A standpipe conducts agglomerates of ash matter with intermingled particles of coke away from the bottom of the lower zone. This standpipe terminates in a mechanical grate for discharging the agglomerates. The agglomerates in the standpipe constitute a gravitating bed resting upon the mechanical grate. There is a space beneath the grate receiving ash agglomerates. Means are provided for supplying an oxidizing medium to this space to flow upward past the grate and into the gravitating bed at a rate sufficient to oxidize the intermingled particles of coke to gaseous species. There are means for discharging ash agglomerates from the space.

The fluidizing-gas velocity in the aforementioned slow fluidized bed of coke intermingled with ash agglomerates is preferably greater than about 7 feet per second.

SUMMARY OF THE OPERATING FEATURES OF THE INVENTION

For operating the apparatus of the invention, suitable solid fuels are anthracites, subanthracites, bituminous coals, subbituminous coals, and lignites, or cokes prepared from these materials. The ash matter in the fuel suitably displays an initial deformation temperature by the A.S.T.M. test above about 2,300°F. Important United States coals, notably Pennsylvania anthracites, contain ash with initial deformation temperatures above 2,300°F.

A suitable gasification medium is a mixture of oxygen or air enriched in oxygen with steam or carbon dioxide. Also suitable are mixtures of air with steam, or air with carbon dioxide, and of air with combustion products containing carbon dioxide. Air alone is a suitable gasification medium, and is preferred for production of power gas or low-Btu gas for prompt combustion in an industrial furnace or boiler as well as for combustion in a gas turbine or in a system combining gas turbine and steam turbine power equipment. For the latter purpose, there is an advantage in providing apparatus according to the invention for operation at an elevated pressure, preferably greater than about 10 atmospheres.

A suitable oxidizing medium for supply to the space beneath the mechanical grate is air or a mixture of air with steam or carbon dioxide or combustion products. Another suitable oxidizing medium is a mixture of oxygen or air enriched in oxygen with steam or carbon dioxide. The oxidizing medium is often preferably the same gas mixture as that used for the gasification medium.

DISTINCTION BETWEEN SLOW AND FAST FLUIDIZED CONDITIONS

I will now explain the distinction between the slow, stationary, bubbling fluidized bed of the kind usual in fluidization art and the fast fluidized bed specified for the upper zone.

In a slow fluidized bed, the fluidized solid remains in place, the bed displays a distinct upper surface, and the bed is characterized by a relatively continuous solid phase and a relatively discontinuous gas phase. The solid mainly occupies the so-called dense phase, through which gas flows at a velocity that is characteristic of the solid. Additional gas, supplied in excess of gas just needed to sustain this characteristic velocity, passes upward through the bed in form of rising voids or bubbles.

A fast fluidized bed exhibits no upper surface but substantially fills the space available. The solid phase in the fast bed appears on the whole to be the discontinuous phase, and the gas phase appears on the whole continuous. The solid phase appears generally to take the form of streamers and ribbons that both rise and fall, while the gas appears to flow upward inbetween. A fast bed is created when both powder and gas are supplied to the bottom of a space at suitable rates. Although the powder is conveyed upward through the fast bed and out of the bed at the top, much refluxing of the solid occurs in the fast bed in the form of falling ribbons or streamers of solid. It should be noted that these remarks are based upon visual observation of the fast fluidized condition, as well as upon viewing of motion pictures of a fast bed taken at high speed, when the fast bed exhibited a density between about 2 and 4 pounds per cubic foot. Densities as high as 8 to 10 pounds per cubic foot can be achieved for a powder having a particle density of 55 pounds per cubic foot and a median particle diameter of about 60 microns with a range of diameter between about 20 and about 150 microns. At these higher densities, observation of the details of the structure of the fast bed becomes more difficult, but such observation suggests that both solid and gas phases become on the whole continuous at the higher densities. It appears that the streamers and strands of the powder become linked in a system of rapidly circulating material that includes many vortices resembling tiny tornadoes, that is to say, a reticulated net of strands in three dimensions that are continually forming and breaking down and moving rapidly up and down and from side to side and especially in circular motions.

To achieve the fast bed condition, the gas must be supplied at a rate to provide a velocity in the fast bed space beyond a critical velocity characteristic of the powdered solid. For example, for the aforementiond powder, the critical velocity of atmospheric air for creation of the fast fluidized condition is about 6 feet per second. At a gas velocity beyond the critical velocity and preferably not greater than about 25 feet per second, the fast fluidized condition is realized if solid is supplied to the bottom of the space at a rate beyond that at which the gas flowing at the given velocity is capable of conveying the solid upward in the so-called dilute-phase condition. It should be noted that even in dilute-phase conveying of a fine solid powder in the upward direction, contrary to the impression created by many discussions of the subject, the solid moves in streamers or strands or ribbons. The transition from dilute-phase conveying to the fast fluidized bed, that will be seen to occur in an experiment in which solid input to the bottom of the space is gradually increased while gas velocity is held fixed, involves the sudden appearance of falling ribbons or streamers intermingled with rising ribbons or streamers. As solid input is further increased, the aforementioned net of rapidly vortexing solid strands develops.

The aforementioned critical gas velocity necessary to achieve the fast bed condition is a function of particle size, being larger for particles of larger size. From a discussion with experts on formation of hail stones, it would appear that nascent hailstones in a storm cloud may resemble a fast fluidized bed. This discussion gives rise to the impression that there is no upper limit to the size of particle that can be placed into the fast fluidized condition provided a gas supply sufficiently great and a vessel sufficiently large be available.

COKE PARTICLE SIZE IN FAST FLUIDIZED BED ZONE

For operation of the apparatus of the instant invention, it will be appreciated that the coke dust of the fast fluidized bed of the upper zone is inherently relatively fine by comparison with the larger particles present in the coal or coke feed. If the solid fuel charged to the apparatus has been prepared by crushing to a size smaller than ¼ inch, for example, the feed fuel will inherently contain some material smaller than 150 microns, for example. Even should the feed fuel consist exclusively of large particles (when, for example, fine particles have been withdrawn from the feed fuel for application elsewhere), the gasification of the large particles in the slow fluidized bed of the lower zone will produce fine particles that will enter the upper zone. Gasification of a carbon particle proceeds throughout the interior of the particle. There is eventually produced a skeleton structure that spontaneously breaks up into finer particles. Operation of the apparatus of the invention should preferably aim to maintain particles in the fast bed of the upper zone that are between about 20 and about 150 microns in size. If their size should fall much below about 20 microns, it will be advisable to feed lesser amounts of fine sizes in the solid feed fuel and generally to provide a coarser feed material. It may also be advisable to withdraw material from the fast bed for disposal elsewhere as in a combustion for example. If the particles in the fast bed rise much above about 150 microns in size, it will be advisable to provide a finer feed fuel.

THERMAL COMMUNICATION ADVANTAGE OF THE FAST BED

In contrast to the poor thermal communication afforded by the dilute-phase condition, a fast fluidized bed exhibits good thermal conductivity in vertical as well as lateral direction. When the aforementioned transition from dilute-phase conveying to the fast fluidized condition occurs, there is a sharp advance in thermal conductivity.

As my aforementioned U.S. Pat. Nos. 3,840,353 and 3,855,070 disclosed, there is good thermal communication between a fast fluidized bed of relatively finer solid and a subposed, contiguous slow bubbling fluidized bed of relatively coarser solid. Accordingly, the fast fluidized and slow fluidized beds of upper and lower zones respectively of the apparatus of the instant invention will be at substantially the same temperature in spite of the fact that a relatively large quantity of heat is released in the slow fluidized bed by virtue of the rapid reaction therein of oxygen with carbon to form carbon dioxide. Much of this heat will flow by conduction from the slow bed to the superposed fast bed to sustain in the latter bed the slow endothermic reactions of steam and carbon dioxide with carbon to form carbon monoxide and hydrogen.

As further disclosed in my aforementioned U.S. Pat. No. 3,840,353, there is exceptionally effective transfer of heat from hot particles of a fast fluidized bed to a cold particle introduced thereinto. This property of the fast bed becomes important if a caking bituminous coal is to be treated by the apparatus of the invention. In such case, it is advantageous to situate the means for feeding the solid fuel into the vessel at an elevation such that the fuel enters the vessel at an elevation intermediate between top and bottom of the upper zone. With this arrangement, fine particles in the coal turn promptly into particles of fine coke and join the particles of the upper zone, while large particles of coal undego rapid heating as they fall through the fast fluidized bed zone, so that an outer skin of each such particle is thoroughly coked by the time the particle reaches the slow fluidized bed below. The height of the point of entry of coal above the lower zone is preferably such as to allow at least about 1 second time of fall of the largest particle in the coal feed before it reaches the lower zone. By this arrangement, a highly caking bituminous coal can be introduced into the gasification bed without risk of formation of a massive agglomerate of coke solids, such as have frequently appeared in previous attempts to gasify such a coal in a fluidized bed. The arrangement obviates any necessity for a coal pretreatment step involving a light oxidation of the coal to reduce its caking and agglomerating tendencies.

CAPACITY ADVANTAGE OF A FAST FLUIDIZED BED

A further advantage of the fast fluidized bed is that it can treat gas at a high throughput per unit cross-sectional area while yet maintaining a relatively large inventory of carbon for purpose of promoting the aforementioned slow endothermic reactions of carbon with steam and of carbon with carbon dioxide. For example, solid fluidized densities approaching 10 pounds per cubic foot can be sustained at a gas velocity in the neighborhood of 10 feet per second. The fast bed may be of almost any height that is practicable to build and to site in view of requirements for safety of air travel or in view of other siting considerations. It is evident that the fast bed affords an exceptional capability for bringing the gasification agents steam and carbon dioxide into intimate contact with carbon in form of fine particles in a vessel of exceptionally small cross-sectional area. The fast bed also provides for good utilization of fine carbon particles created by gasification.

BRIEF DESCRIPTION OF THE DRAWING

The invention including various novel features will be more fully understood by reference to the one accompanying sheet of drawing and the following description of the operation of the apparatus illustrated therein. The drawing provides a schematic diagram of a preferred embodiment of the invention.

DESCRIPTION OF THE PREFERRED EMBODIMENTS

Reference is now made to the accompanying schematic drawing. Crushing means 2 crushes anthracite, subanthracite, bituminous, or subbituminous coal or lignite, or a coke produced from these solid fuels, from line 1 to a size preferably smaller than about ¾ inch. The ash matter in the fuel suitably displays an initial deformation temperature above about 2,300°F. Line 3 conveys crushed solid from crushing means 2 to drying-and-heating means 4. Line 5 carries dried and heated coal to lock system 6, which is supplied with a gas from line 7. Lock system 6 preferably has the form disclosed in U.S. Pat. No. 3,710, 192 Mar. 6, 1973). Coal passes from lock system 6 into vessel 9 via line 8. In a unit of large throughput, a multiplicity of lines 8 is advantageously provided, but for simplicity of the drawing, only one line 8 is shown. Vessel 9 houses slow fluidized bed 10, comprising coke particles of relatively larger sizes undergoing gasification intermingled with growing agglomerates of ash matter, and a contiguous fast fluidized bed 11, comprising coke particles of smaller sizes undergoing gasification. Larger particles present in the coal feed fall from line 8 into bed 10 and are coked with release of volatile matter. Smaller particles present in the coal feed join the fine coke of bed 11 and are also coked with release of volatile matter.

Gasification medium is introduced into bed 10 from a multiplicity of substantially horizontal inlet pipes 12 penetrating frusto-conical segment 13 of the walls of vessel 9. The included angle of segment 13 is preferably about 60°. The gasification medium may be oxygen and steam, if a gas comprising primarily hydrogen and carbon monoxide is desired, or oxygen and carbon dioxide to obtain a gas comprising primarily carbon monoxide. The medium may be air and steam, or air and carbon dioxide, or air and combustion products containing carbon dioxide, if a fuel gas of relatively low heating value is desired for prompt combustion. The gasification medium may also comprise simply air. A mixture of air enriched in oxygen with steam or carbon dioxide is also suitable. The temperature of the gasification medium is adjusted by heating means 76 and the composition of the medium is adjusted by regulating the flows from sources 71 and 73 of separate agents present in the gasification medium by means of valves 72 and 74 respectively. For example, oxygen might be supplied from 71 and steam from 73. The adjustments of temperature and composition of gasification medium are preferably made so that the temperature of bed 10 is between about 2,050° F and about 2,650°F. The superficial fluidizing-gas velocity in bed 10 should be greater than the minimum fluidizing velocity of a bed of coal particles of substantially the largest size present in the coal feed. In general, the velocity should be greater than about 4 feet per second, and is preferably greater than about 7 feet per second.

The pressure in vessel 9 is in general preferably elevated above about 10 atmospheres. If, however, vessel 9 operates at substantially atmospheric pressure, lock system 6 may be omitted.

When a strongly caking bituminous coal is treated, line 8 should enter vessel 9 at an elevation between the upper surface of bed 10 and outlet line 14. The height of fast fluidized bed 11 and the location of line 8 should be such to allow preferably at least about 1 second resistance time for fine particles in the coal in bed 11 before such particles are blown out of bed 11 via line 14, this residence time being reckoned on basis of the superficial gas velocity in space 11 and the difference in elevation of lines 8 and 14. Also, the height of bed 11 and the location of line 8 should be such to allow preferably at least about 1 second residence time within bed 11 for the largest coal particles as they fall toward bed 10, this time being reckoned on basis of the free fall velocity of such particles and the difference in elevation of the upper surface of bed 10 and line 8.

Under the conditions specified for bed 10 and space 11, both volatile matter and coke react with gasification medium to form a mixture of methane, hydrogen, carbon monoxide , water vapor, and carbon dioxide (together with nitrogen if the gasification medium includes air). Gases leaving bed 11 via line 14 contain negligible amounts of tar and small amounts of hydrocarbons higher than methane.

As coke is consumed in bed 10 by gasification reactions, the larger coke particles comprising bed 10 waste away, and as a consequence, ash matter is released and coke dust is formed. The coke dust enters bed 11. At a temperature in the range specified for bed 10, the ash matter of substantially all coals is sticky, even coals having ash that displays an initial deformation temperature above about 2,300°F. Ash sticks to ash, not to coke; and, as ash matter is released, ash agglomerates form and grow in size. At the fluidizing-gas velocity specified for bed 10, ash agglomerates grow in roughly spherical form and individual ash agglomerates do not coalesce to irregular masses of agglomerated ash of such large size as to block the flow of gas in bed 10. In other words, the ash agglomerates remain freely fluidized in bed 10.

When an ash agglomerate grows too large to remain fluidized at the velocity prevailing in bed 10, the agglomerate sinks to the bottom of bed 10 and enters zone 15 in section 16 of vessel 9. Section 16 has a substantially vertical wall, or zone 15 may sometimes advantageously be somewhat larger in horizontal cross-section at bottom than at top. Zone 15 is occupied by a gravitating bed of ash agglomerates, the discharge of agglomerates from zone 15 being governed by rotating grate 17, which is provided with a suitable drive 18. Ash agglomerates drop into pile 20 housed in chamber 19, and pass therefrom via line 23 to lock system 24, where they are let down to the atmosphere through line 25.

A medium containing oxygen or air, preferably admixed with steam or carbon dioxide, is introduced into chamber 19 from line 22 at a rate governed by valve 77. The rate should be governed so that the medium is sufficient to combust or gasify substantially all coke particles that enter zone 15 from bed 10 along with the ash agglomerates. The rate should also preferably be governed so that ash agglomerates arriving at rotating grade 17 are cooled to substantially the temperature of the medium, suitably a few hundred degrees Fahrenheit. The medium is suitably the same gas mixture as the gasification medium supplied to bed 10 through pipes 12, or a mixture of the same chemical species at a different composition.

If desired, ash agglomerates may be fluidized in a portion of zone 15 by introducing additional gasification medium via several optional lines 26 at a rate to maintain an appreciably higher fluidizing-gas velocity in the upper part of zone 15 than in bed 10. This expedient will serve to reduce the quantity of coke entering zone 15 at the top along with ash agglomerates.

Gas product leaves the top of bed 11 via pipe 14 and enters cyclone gas-solid separator 27. Solid removed from the gas by separator 27 is returned via standpipe-and-U-tube 28 back into bed 11 near its bottom elevation. Gas product of greatly reduced dust content passes from separator 27 via line 29, and may advantageously flow to further equipment for cleaning the gas of last traces of dust, for removing sulfur species, or for other treatment.

Line 31 provides aeration gas to fluidize coke dust in standpipe-and-U-tube 28 with formation therein of space 30 in which fine coke particles are maintained in the slow fluidized condition. Aeration lines 32 are also advantageously provided. Valve 80 is provided to control flow of aeration gas in line 31. This furnishes a control on rate of flow of fine coke particles from space 30 to bed 11. The rate of flow of solid from space 30 to bed 11 should match the rate of discharge of solid from fast fluidized bed 11 to cyclone 27 via line 14. This rate of discharge is a function of the inventory of solid in bed 11, a larger inventory giving rise to a larger rate of discharge of solid. From another point of view, the rate of flow of solid from space 30 to bed 11 is a control on the inventory of solid in bed 11, a higher rate of flow serving to increase the inventory. The rate of flow should be sufficient to maintain a fast fluidized condition in bed 11. If desired, a valve (not shown in the drawing) may be supplied in tube 28 to assist in control of the rate of circulation of coke dust.

Aeration gas supplied via line 31 is advantageously steam, in accordance with the disclosure of my aforementioned co-pending application Ser. No. 257,432, now U.S. Pat. No. 3,840,353.

Optionally, additional gasification medium may be furnished through a multiplicity of optional lines 33 near the bottom of zone 11.

Make-gas from line 29 may conveniently be used to supply gas to line 7.

EXAMPLE

I now give an example of an operation of the equipment depicted in the drawing. Pennsylvania anthracite coal is supplied through line 1 in an amount comprising 100,000 pounds per hour of moisture-free coal having the following analysis (expressed in weight per cent):

| | |
|---|---|
| 86.7 | carbon |
| 2.2 | hydrogen |
| 2.9 | oxygen |
| 0.5 | nitrogen |
| 0.8 | sulfur |
| 6.9 | ash |

The higher heating value of the coal is 13,540 Btu per pound (dry basis). The coal is dried to a moisture content of 3 weight per cent and is heated to 100°F in means 4. Make-gas from line 29 is used in line 7. Gasification medium supplied to lines 12 comprises 1,435.4 pound-moles per hour (m./hr.) of steam and 5,117.0 m./hr. of a gas containing 50 volume per cent (%) of oxygen, 49.38% nitrogen, and 0.62% argon, that is to say, an air enriched in oxygen. The gasification medium is supplied at 1,000°F. Aeration gas from line 31 comprises 100 m.hr. of steam at 1,000°F. Ash agglomerates amount to 6,900 pounds per hour. Gas supplied via line 22 comprises 116.4 m./hr. of steam and 414.9 m./hr. of the same air enriched in oxygen containing 50% oxygen, and the gas in line 22 is at 100°F. Beds 10 and 11 operate at 2,400°F and 20 atmospheres. Make-gas in line 29 amounts to 12,814.4 m./hr. and has the following composition (expressed in mole per cent):

| | |
|---|---|
| 55.0 | CO |
| 1.1 | $CO_2$ |
| 0.2 | $CH_4$ |
| 20.5 | $H_2$ |
| 1.3 | $H_2O$ |
| 0.2 | $H_2S$ |
| 21.4 | $N_2$ |
| 0.3 | A |
| 100.0 | |

The gas has a higher heating value of 246 Btu per cubic foot, and is eminently well suited for industrial fuel purposes.

I do not wish my invention to be limited to the particular embodiment illustrated in the drawing and described above in detail. Other arrangements will be recognized by those skilled in the art, as well as other purposes which the invention can advantageously serve.

I claim:

1. Apparatus for gasifying granulated coal or coke prepared from coal, comprising:
   a. a vessel housing contiguous upper and lower zones;
   b. means for feeding to said vessel a granulated solid fuel selected from the group consisting of anthracites, subanthracites, bituminous coals, subbituminous coals, lignites, and cokes prepared from anthracites, subanthracites, bituminous coals, subbituminous coals, and lignites;
   c. means for introducing a gasification medium into said lower zone wherein said medium is selected from the group of gas mixtures consisting of steam and oxygen, carbon dioxide and oxygen, steam and air enriched in oxygen, carbon dioxide and air enriched in oxygen, air, air and steam, air and carbon dioxide, and air and combustion products containing carbon dioxide and wherein the rate of said introduction is such as to establish in said lower zone a slow fluidized bed comprising particles of coke originating from said fuel intermingled with agglomerates of ash matter and wherein the temperature of said slow fluidized bed is between about 2,050°F and about 2,650°F and wherein the fluidizing-gas velocity in said bed is greater than about 4 feet per second;

d. means for substantially separating gas and solid particles and a connection of said means to the top of said upper zone;

e. pipe means for discharging said separated gas;

f. means for conducting said separated particles in a slow fluidized condition from said separating means (d) to substantially the bottom of said upper zone at a rate of flow of said separated particles into said upper zone sufficient to establish therein a fast fluidized bed of said separated particles together with fine particles of coke entering said upper zone from said slow fluidized bed in said lower zone;

g. a standpipe for conducting agglomerates of ash matter together with intermingled particles of coke away from the bottom of said lower zone wherein said standpipe terminates in a mechanical grate for discharging said conducted agglomerates and wherein said conducted agglomerates constitute a gravitating bed in said standpipe and wherein said gravitating bed rests upon said mechanical grate;

h. a space beneath said mechanical grate and receiving ash agglomerates therefrom;

i. means for supplying an oxidizing medium to said space to flow upward past said grate and into said gravitating bed at a rate sufficient to oxidize said intermingled particles of coke to gaseous products; and j. means for discharging ash agglomerates from said space in (h).

2. Apparatus of claim 1 in which said granulated solid fuel is selected from the group consisting of caking bituminous coals, and wherein said means (b) is situated at an elevation such that said granulated solid fuel enters said vessel at an elevation intermediate between said top and said bottom of said upper zone.

3. Apparatus of claim 1 in which said means for introducing said gasification medium in (c) is capable of maintaining a rate of introduction such that the fluidizing-gas velocity in said slow fluidized bed in (c) is greater than about 7 feet per second.

4. Apparatus of claim 1 in which said vessel in (a) is capable of housing said upper and lower zones at a pressure greater than about 10 atmospheres.

5. A process for gasifying granulated coal or coke prepared from coal, comprising:

a. supplying a granulated solid fuel selected from the group consisting of anthracites, subanthracites, bituminous coals, subbituminous coals, lignites, and cokes prepared from anthracites, subanthracites, bituminous coals, subbituminous coals, and lignites to a vessel housing contiguous upper and lower fluidized bed zones which are at a temperature between about 2,050°F and about 2,650°F and wherein said lower zone comprises a slow fluidized bed of larger particles of coke originating from the larger particles of said granulated fuel together with particles of agglomerated ash matter wherein said ash matter was originally present in said granulated fuel and wherein said upper zone comprises a fast fluidized bed of smaller particles of coke originating from the smaller particles of said carbonaceous matter and also from the degradation of said larger particles of coke of said lower zone;

b. supplying a gasification medium as fluidizing gas to said lower zone at a fluidizing gas velocity greater than about 4 feet per second at said temperature and wherein said gasification medium is selected from the group of gas mixtures consisting of oxygen and steam, air and steam, air, oxygen and carbon dioxide, air and carbon dioxide, air and combustion products containing carbon dioxide, steam and air enriched in oxygen, and carbon dioxide and air enriched in oxygen;

c. withdrawing products of the gasification of said fuel together with said smaller coke particles from substantially the top of said upper zone, substantially separating said products of gasification from said smaller coke particles, causing said separated smaller coke particles to flow into a region in which said smaller coke particles are maintained in a slow fluidized condition, and causing said smaller coke particles to flow from said region into said upper zone at a rate sufficient to maintain a fast fluidized condition in said upper zone;

d. withdrawing particles of agglomerated ash matter from the bottom of said lower zone;

e. conducting said withdrawn particles of agglomerated ash matter in a gravitating bed to a space;

f. introducing into said space an oxidizing medium to cause said medium to flow upward through said gravitating bed and into said lower zone and thereby to oxidize particles of coke intermingled with and accompanying said particles of agglomerated ash matter withdrawn in said step (d);

g. withdrawing particles of agglomerated ash matter substantially free of carbon from said space; and h. discharging said separated products of gasification.

6. The process of claim 5 wherein said granulated solid fuel is selected from the group consisting of caking bituminous coals and wherein said fuel is supplied to said vessel at an elevation intermediate between said top and said bottom of said upper zone.

7. The process of claim 6 wherein said fluidized bed zones are at a pressure greater than about 10 atmospheres.

* * * * *